United States Patent [19]

Sollich

[11] 4,431,678

[45] Feb. 14, 1984

[54] PROCESS FOR THE APPLICATION OF A VISCOUS CHOCOLATE MASS ON A PLURALITY OF IRREGULARLY-SHAPED INDIVIDUAL OBJECTS

[76] Inventor: Helmut Sollich, Kammweg 2, D 4925 Kalletal 4, Fed. Rep. of Germany

[21] Appl. No.: 365,499

[22] Filed: Apr. 5, 1982

Related U.S. Application Data

[63] Continuation-in-part of Ser. No. 236,531, Feb. 20, 1981, abandoned.

[51] Int. Cl.³ .......................... A23G 3/00; A23G 3/20
[52] U.S. Cl. ...................................... 426/306; 118/13; 426/103; 426/660
[58] Field of Search ............... 426/306, 631, 660, 307, 426/303, 93, 103, 519; 118/13, 16, 24, 203; 427/428

[56] References Cited

U.S. PATENT DOCUMENTS

| | | | |
|---|---|---|---|
| 1,582,644 | 4/1926 | Dumas | 118/13 |
| 3,638,553 | 2/1972 | Kreuter | 426/519 |
| 4,032,667 | 6/1977 | Kreuter | 426/306 |

FOREIGN PATENT DOCUMENTS 2738894  3/1979  Fed. Rep. of Germany ........ 118/13

*Primary Examiner*—Raymond N. Jones
*Assistant Examiner*—George C. Yeung
*Attorney, Agent, or Firm*—Scully, Scott, Murphy and Presser

[57] ABSTRACT

A process wherein in order to be coated with chocolate, irregularly-shaped objects are placed on a perforated conveyor which is driven to convey them below a roller and above the surface of chocolate in an open-topped bottom container. The roller is mounted for rotation in a bottom outlet of a top chocolate container and is rotatably driven independently of the conveyor so as to stir up chocolate in the top container and to extract chocolate therefrom. Two doctor blades mounted respectively forward and behind the lowest point of the roller in order to, respectively, limit the thickness of chocolate on the roller and to displace it therefrom. Liquid chocolate is continuously pumped from the bottom container into the top container. The undersides of the objects are coated with chocolate before they reach the roller.

2 Claims, 1 Drawing Figure

U.S. Patent  Feb. 14, 1984  4,431,678
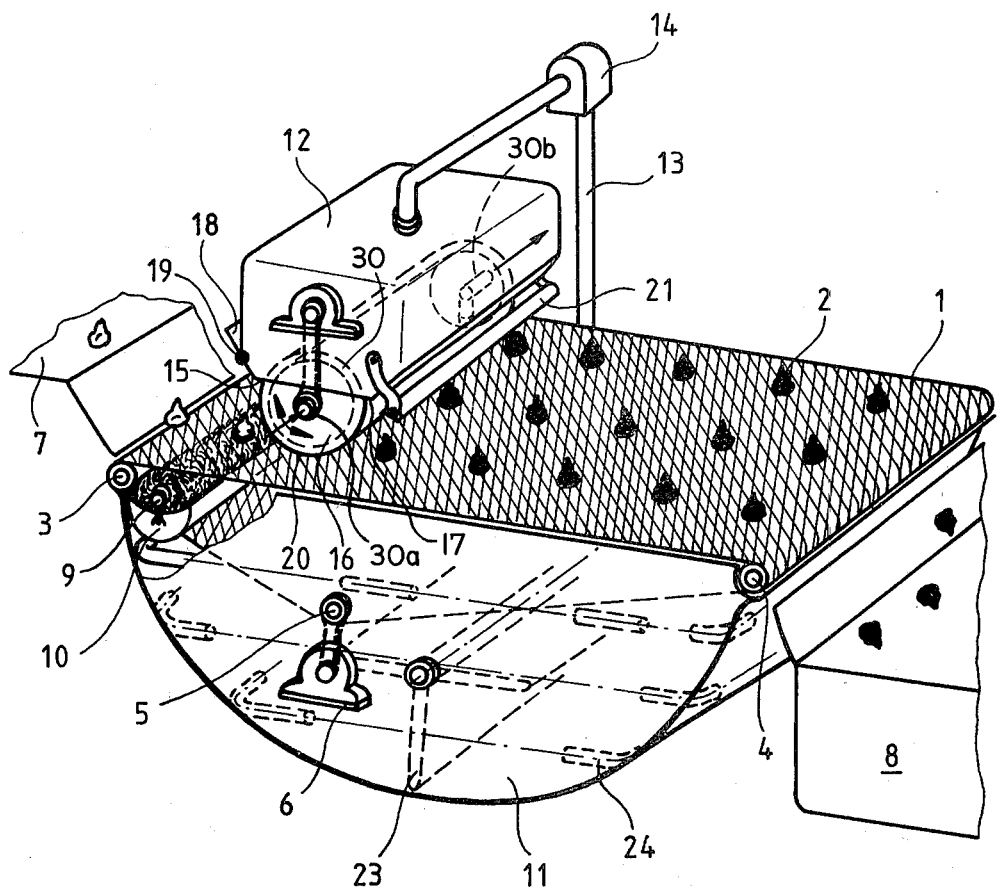

PROCESS FOR THE APPLICATION OF A VISCOUS CHOCOLATE MASS ON A PLURALITY OF IRREGULARLY-SHAPED INDIVIDUAL OBJECTS

The present invention is a continuation-in-part of application Ser. No. 236,531, filed Feb. 20, 1981, and now abandoned.

BACKGROUND OF THE INVENTION

FIELD OF THE INVENTION

The present invention relates to a process for the application of a viscous chocolate mass on a plurality of irregularly-shaped individual objects. Concerning the term "objects," this is to be understood to include, within the context of the invention confections, baked goods, the centers of pralines or dragees and the like.

The invention is particularly concerned with the fact that objects having an extensively irregular surface contour are uniformly and non-porously covered by the chocolate mass. The term "uniformly" should signify that the coating has an overall constant thickness. "Non-porous" should signify that the surface of the coating is completely smooth. A uniform and non-porous coating should also be achieved when, at a relatively high speed of the objects, the chocolate mass is to be applied upon being dispensed from a stationary receiving container for the chocolate mass.

SUMMARY OF THE INVENTION

This problem is solved by the present invention through the following novel process steps:

1. By means of a pump, a continuously liquid chocolate mass is withdrawn from a lower container and conveyed into the upper container;
2. continuously liquid chocolate mass is conducted through an outlet at the lower end of the upper container into the lower container;
3. the chocolate mass is continually withdrawn from the upper container through a rotating roll located in the lower outlet of the upper container, and is thereby stirred;
4. through a first doctor blade located ahead of the lowest point of the roll, as viewed in the direction of rotation of the roll, there is adjusted the thickness of the chocolate mass adhering to the roll;
5. through a second doctor blade located behind the lowest point of the roll, again as viewed in the direction of rotation of the roll, the chocolate mass is scraped off from the roll;
6. ahead of the region of the roll, the objects which are to be coated are coated with the chocolate mass along their bottom surface;
7. while resting on a grid-like conveyor belt, the objects which have been coated on their bottom surface are continuously conveyed past between the lowest point on the roll and the surface of the chocolate mass in the lower container wherein the spacing between the lowest point on the roll and the upper surface of the objects to be coated is not substantially larger than is necessary for the movement of the objects;
8. the roll and the conveyor belt are each driven independently of each other by, respectively, a special drive motor, the roll being rotated at a higher rotational speed relative to the movement of the conveyor;
9. a cooling mantle is further provided in close proximity to the roll which is fed by cooling liquid through the rotational shaft of the cylinder wherein the cooling mantle effectively dissipates the frictional and the crystallization heat generated in the chocolate mass contained within the upper container.

By means of the present invention, the chocolate mass is withdrawn from the upper container with air bubbles contained therein. Due to the nature of the decreased fat content in commercially available chocolates, the viscosity of the chocolate has increased thereby increasing the chocolate's tendency to entrap air bubbles therein. In order to form a uniformly thick, but relatively thin film on the roll, a relatively high rotational speed is imparted to the cylinder so as to create thereby further good preconditions so that the additional air bubbles still present can be broken and removed from the chocolate mass. Moreover, through the uniform thickness of the film on the roll consisting of the chocolate mass, there can be assured that the mass will be uniformly conducted onto the objects which are consequently enveloped with a uniform thickness. The peeling off of the mass from the roll with the second doctor blade once again supports this effect in that the entire mass taken up by the drum is peeled off. This peeling effect, in combination with the gravity, produces an extremely uniform takeoff of the mass from the drum so that the mass can readily apply itself to all parts of the object which is to be coated which adheres on the conveyor belt with its already previously coated bottom surface. The conveyor belt is constructed grid-shaped so that excess chocolate mass can drop down whereby, even at the lower end of the object, the coating is no thicker than in the remaining region. The mutually independent drive assemblies of the conveyor belt and of the roll, each by means of a separate motor, finally allows for an optimum coordination or setting for the entire installation by imparting a high rotational speed to the cylinder relative to the conveyor belt.

BRIEF DESCRIPTION OF THE DRAWING

Reference may now be had to the following detailed description of a preferred embodiment of the invention, taken in conjunction with the single FIGURE of the accompanying drawing perspectively illustrating a chocolate mass-applying installation.

DETAILED DESCRIPTION

A plurality of suitable, but above all extensively irregularly-shaped objects 2 are arranged on a grid-like conveyor belt 1. The conveyor belt forms a closed loop which is conducted over rollers 3, 4 and 5. The roll 5 is driven by a motor 6 and so engages into the conveyor belt that the conveyor belt 1 is driven by the motor 6 through the roll 5 and will constantly travel. In the plane of the drawings, the upper run of the conveyor belt which takes up the objects which are to be coated, travels from left to right. At the beginning or inlet end of the conveyor belt, the objects which are to be coated are deposited thereon through a supplying device 7. At the outlet end of the conveyor belt the objects which are coated with chocolate are transferred to a collecting receptacle 8.

At the inlet end of the conveyor belt, the bottom of the objects is initially coated with the chocolate mass. This can be accomplished, for example, with a rotating, roller-shaped brush 9 whose lower portion immerses into a trough 10 filled with chocolate mass and which, with its upper portion, brushes along the lower side of the objects.

The conveyor belt which is supplied with the objects to be coated lies with its lower portion within a lower container 11, whereas the upper portion which carries the objects is conveyed between this container 11 and an upper container 12. The upper and lower containers are interconnected by means of a conduit 13 into which there is built a pump 14. The pump continually conveys chocolate mass from the lower container 11 into the upper container 12. From the upper container 12, the chocolate mass is transported into the lower container 11, as described hereinbelow.

At the lower end thereof, the upper container is provided with a relatively large outlet opening 15. A roll 16 is located within this outlet opening 15. Approximately one-half of the roll projects into the chocolate mass located in the upper container. About one-half of the roll is positioned exteriorly of the container.

The roll 16 is essentially hollow so as to provide a wall structure forming a cooling mantle 30 which is supplied with a suitable cooling medium for the outside of roll 16 through the hollow shaft 30a and discharge at 30b of the rotary connection for the roll 16, whereby a simple heat exchange is formed at the container. This cooling mantle 30 provides the chocolate mass with an outlet for the heat buildup which occurs from the frictional forces caused in the chocolate mass from the interaction of the high viscosity and the action of the chocolate transport pump. Another cause of heat is due to crystallization heat which occurs in the chocolate mass prior to the application to the product. The cooling mantle effectively alleviates all the heat formed therein and consequently relieves the problems which this heat can cause, namely, the chocolate coating on the product appearing dull and the resultant problems associated with cooling the product after the heated mass has been applied. As is further shown at the right-hand end of the drawing, a seal 17 is provided intermediate the edge of the outlet opening 15 and the roll 16. The right gap between the edge of the outlet opening 15 and the roll 16, as shown in the drawing, is adjustable. For this purpose, a doctor blade 18 within a linkage 19 is pivotably supported at the lower end of the wall of the upper container 12. When the doctor blade is either manually or mechanically pivoted, there is then varied the cross-section of the gap. Directly behind the lowest point 20 on the roll 16 there is located a further adjustable doctor blade 21, whose leading edge has a predetermined spacing with respect to the roll, which is so dimensioned that the leading edge of the blade lies just evenly on the roll, but does not influence the rotation of the roll. A motor (not shown) drives the roll for rotation in a clockwise or counterclockwise direction.

The rotation of the roll 16 is set at a higher rotational speed than the speed of the conveyor belt 1 in order to apply the very thin chocolate layer in a sufficient amount to the product 2. The roll 16 is further rotated in a direction opposite to the movement of the conveyor belt 1 so as to provide a more efficient mechanism for the application of the chocolate mass.

When the roll 16 rotates in a counterclockwise direction, then it takes up viscous chocolate mass with its upper portion, which is located in the upper container 12. The thickness of the layer of chocolate mass which adheres to the roll upon leaving the container 12 is determined by the setting of the doctor blade 18. Shortly behind the lowest point on the roll 16, the layer of chocolate mass begins to detach from the roll, and this effect is enhanced by the doctor blade 21, that the chocolate mass detaches from the roll, so that the roll downstream of the blade 21 is free of chocolate mass. The chocolate mass is transferred to the objects which are to be coated, whereby excess chocolate mass passes through the conveyor belt into the lower container. The result is a uniform chocolate coating on the objects, even when these are extensively irregularly-shaped or craggy. When the roll 16 is rotated in a clockwise mode, the doctor blade 21 acts to control the thickness of the layer of chocolate mass which passes between the roll 16 and the blade 21, and which is then deposited on the objects to be coated under the effect of gravity as the chocolate layer drops off the roll surface.

Within the lower container, which is substantially larger than the upper container, the chocolate mass is so tempered with a stirring arrangement 23 and a heating unit 24 located within the double wall of the container 11, so that it will have a viscosity which is desired with consideration to the desired processing.

What is claimed is:

1. In a process for the application of a viscous chocolate mass on a plurality of irregularly-shaped individual objects; wherein the liquid chocolate mass is continually withdrawn from a lower container and is transferred to an upper container; continually conducting said mass from an outlet opening in the lower end of the upper container into said lower container; continually withdrawing said mass through said outlet opening and stirring said mass within the container by arranging a roll in said opening for adjusting the thickness of the chocolate mass adhering to said roll with a first doctor blade located ahead of the lowest point on said roll as viewed in the direction of rotation of said roll; scraping the chocolate mass from said roll with a second doctor blade located behind the lowest point on said roll as viewed in the direction of rotation of said roll; coating the bottom surface of said objects with chocolate mass in the region of said roll; conveying said bottom surface-coated objects on a grid-like conveyor belt continually past and between the lowest point on said roll and the surface of said chocolate mass in said lower container, wherein the spacing between the lowest point on said roll and the upper surface of the objects to be coated is not substantially larger than is necessary for the movement of the objects; wherein the improvement comprises:

(a) rotating the roll in a direction opposite to and at a speed higher than the speed of the conveyor belt so as to efficiently convey the chocolate mass onto the irregularly-shaped objects position on said conveyor belt; and (b) cooling said chocolate mass by a cooling medium within said upper container.

2. In a process as claimed in claim 1, comprising withdrawing the heat created in said chocolate mass by said cooling medium by circulating cooling fluid through a cooling mantle positioned along the inner side of said roll.

* * * * *